US011506132B1

(12) United States Patent
Duranleau-Hendrickx

(10) Patent No.: US 11,506,132 B1
(45) Date of Patent: Nov. 22, 2022

(54) GAS TURBINE ENGINE AND ASSOCIATED METHOD OF CONTROLLING A VALVE

(71) Applicant: PRATT & WHITNEY CANADA CORP., Longueuil (CA)

(72) Inventor: Louis Duranleau-Hendrickx, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/542,825

(22) Filed: Dec. 6, 2021

(51) Int. Cl.
*F02C 9/18* (2006.01)
*F02C 6/08* (2006.01)
*F02C 7/052* (2006.01)
*F02C 7/057* (2006.01)

(52) U.S. Cl.
CPC .................. *F02C 9/18* (2013.01); *F02C 6/08* (2013.01); *F02C 7/052* (2013.01); *F02C 7/057* (2013.01); *F05D 2260/607* (2013.01); *F05D 2260/80* (2013.01); *F05D 2270/80* (2013.01)

(58) Field of Classification Search
CPC .......... F05D 2260/607; F05D 2260/80; F05D 2270/80; F02C 9/18; F02C 6/08; F02C 7/052; F02C 7/057; F02K 3/02; F04D 27/0215; F16K 37/0025; F16K 37/0041; F16K 37/005; F16K 37/0066; F16K 37/0075; F16K 37/0083; F16K 37/0091
See application file for complete search history.

(56) References Cited

U.S. PATENT DOCUMENTS

| | | | |
|---|---|---|---|
| 9,611,941 B1* | 4/2017 | DeFelice | F16K 3/26 |
| 10,890,259 B2 | 1/2021 | Villanueva et al. | |
| 11,125,168 B2 | 9/2021 | Hanlon et al. | |
| 2019/0154157 A1* | 5/2019 | Villanueva | F16K 31/0655 |
| 2020/0131996 A1* | 4/2020 | Hanlon | F02C 6/08 |
| 2020/0131997 A1 | 4/2020 | Hanlon et al. | |

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

The method can include sensing operating conditions of the gas turbine engine; generating a base value signal of a control parameter of the bleed valve based on the sensed operating conditions and on control data; determining whether a contaminant management condition is met; generating a control value signal of the control parameter including the base value signal and, when the contaminant management conditions is met, the control value signal further including a contaminant management signal of the control parameter value of the valve superposed to the base value signal, the contaminant management signal including at least three successive back and forth fluctuations of the control parameter value relative the base value signal over a period of 10 seconds or less; and controlling an actuator of the bleed valve based on the control value signal.

20 Claims, 6 Drawing Sheets

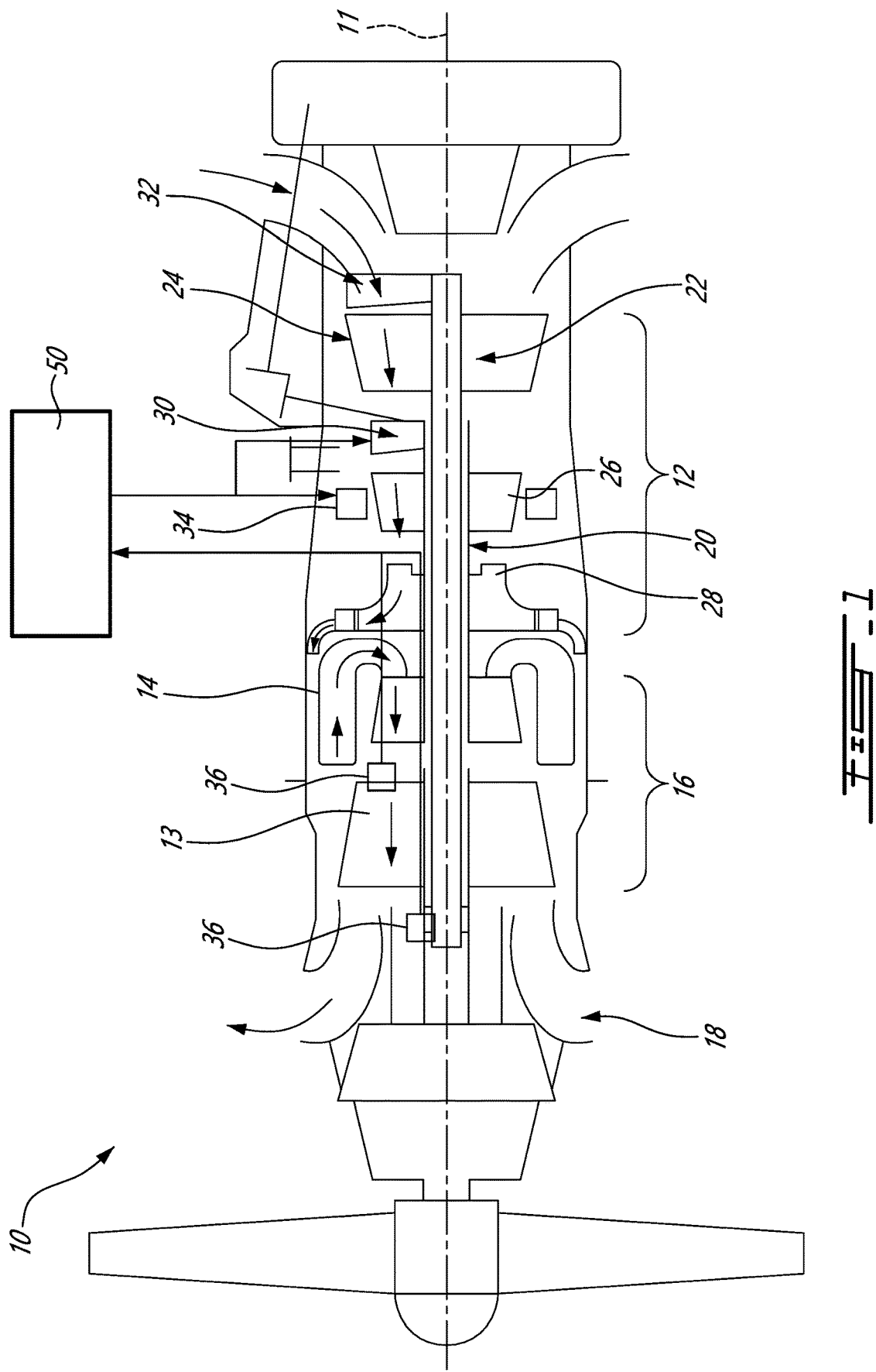

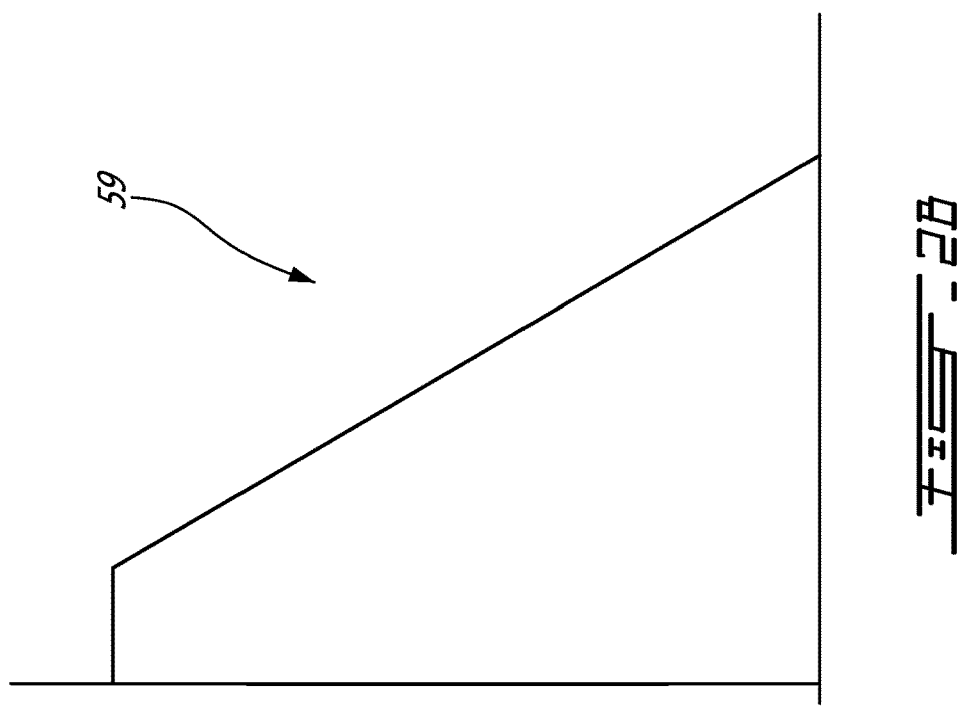
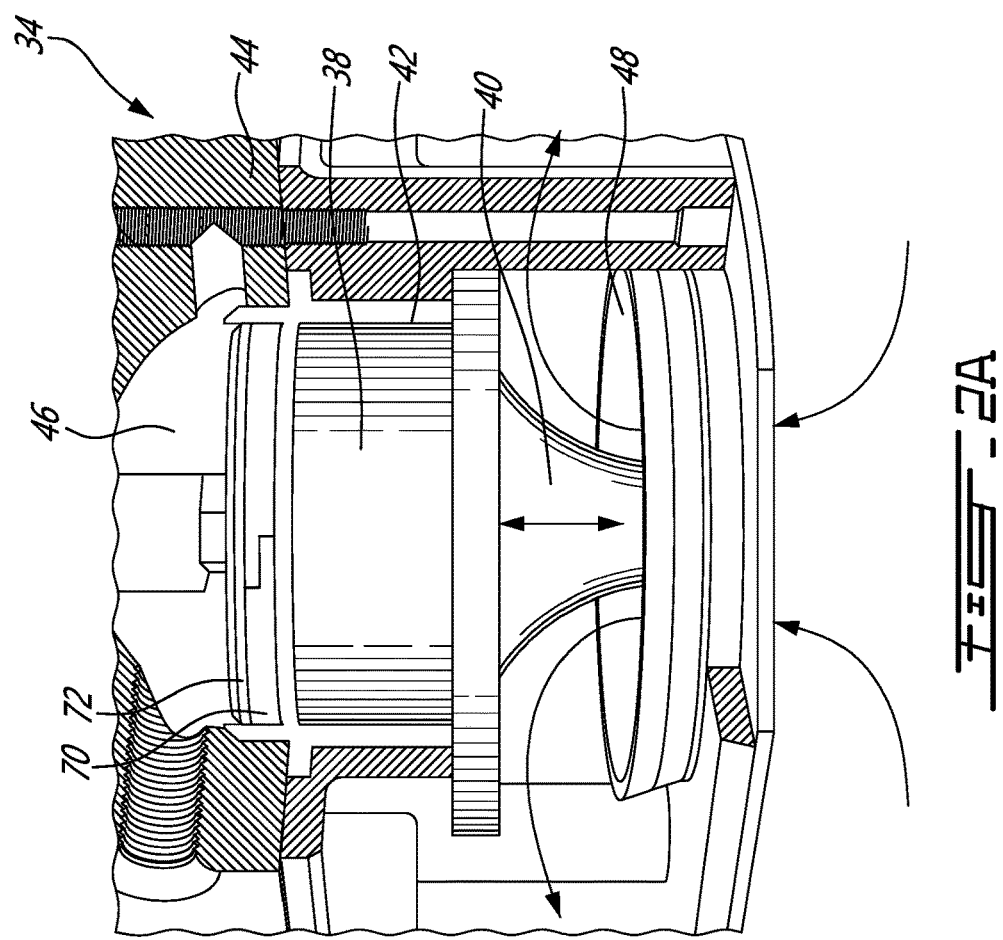

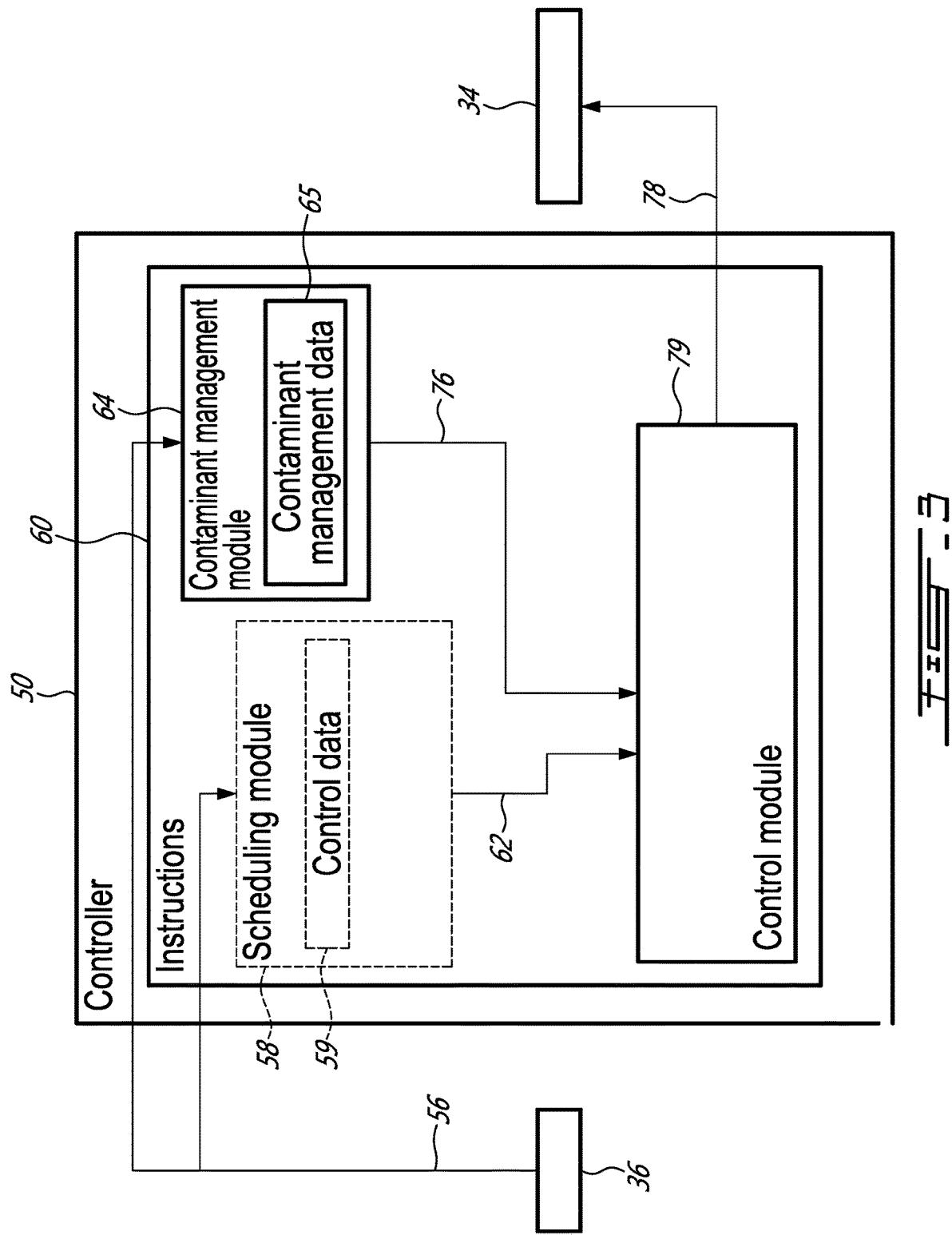

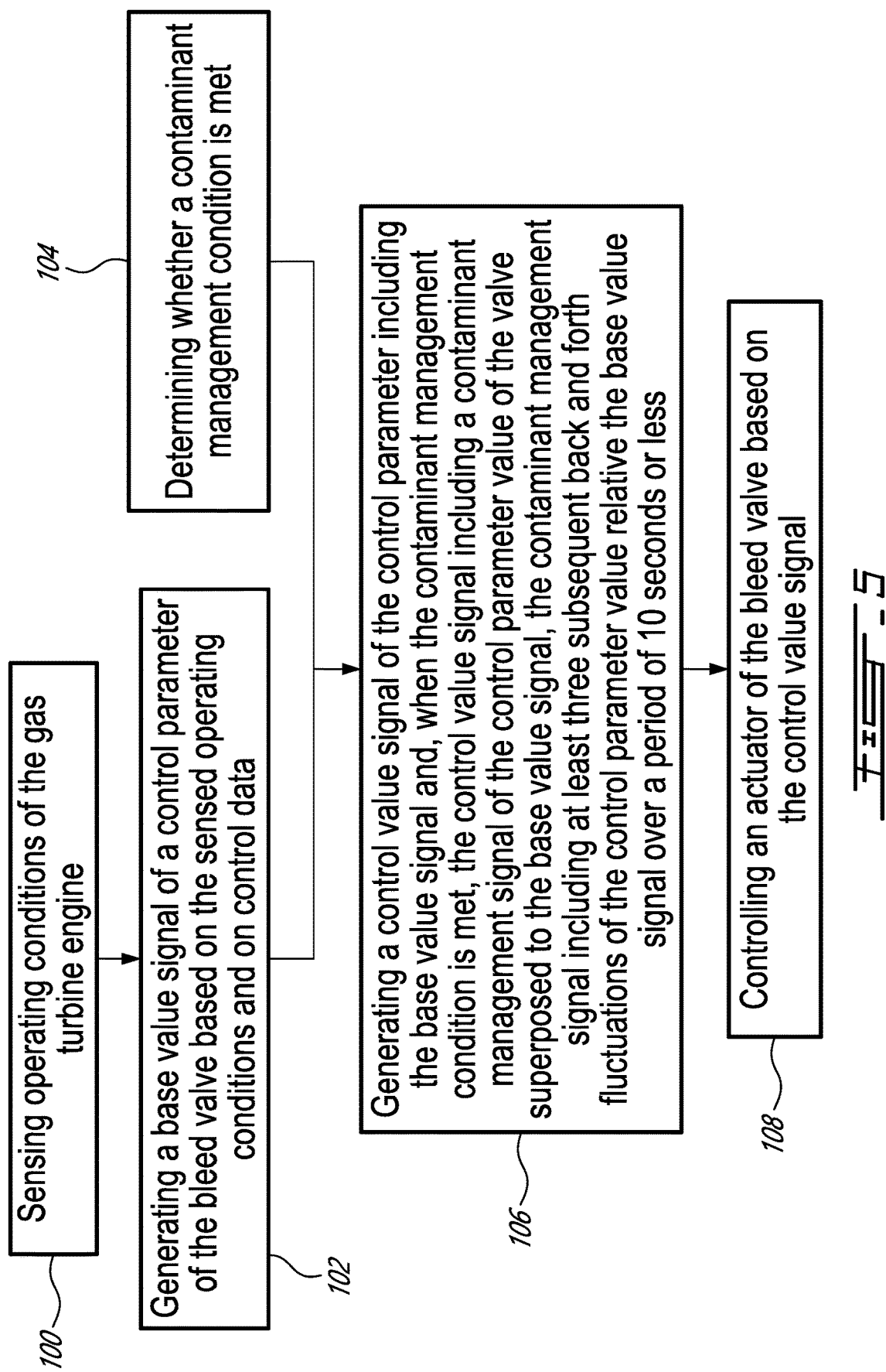

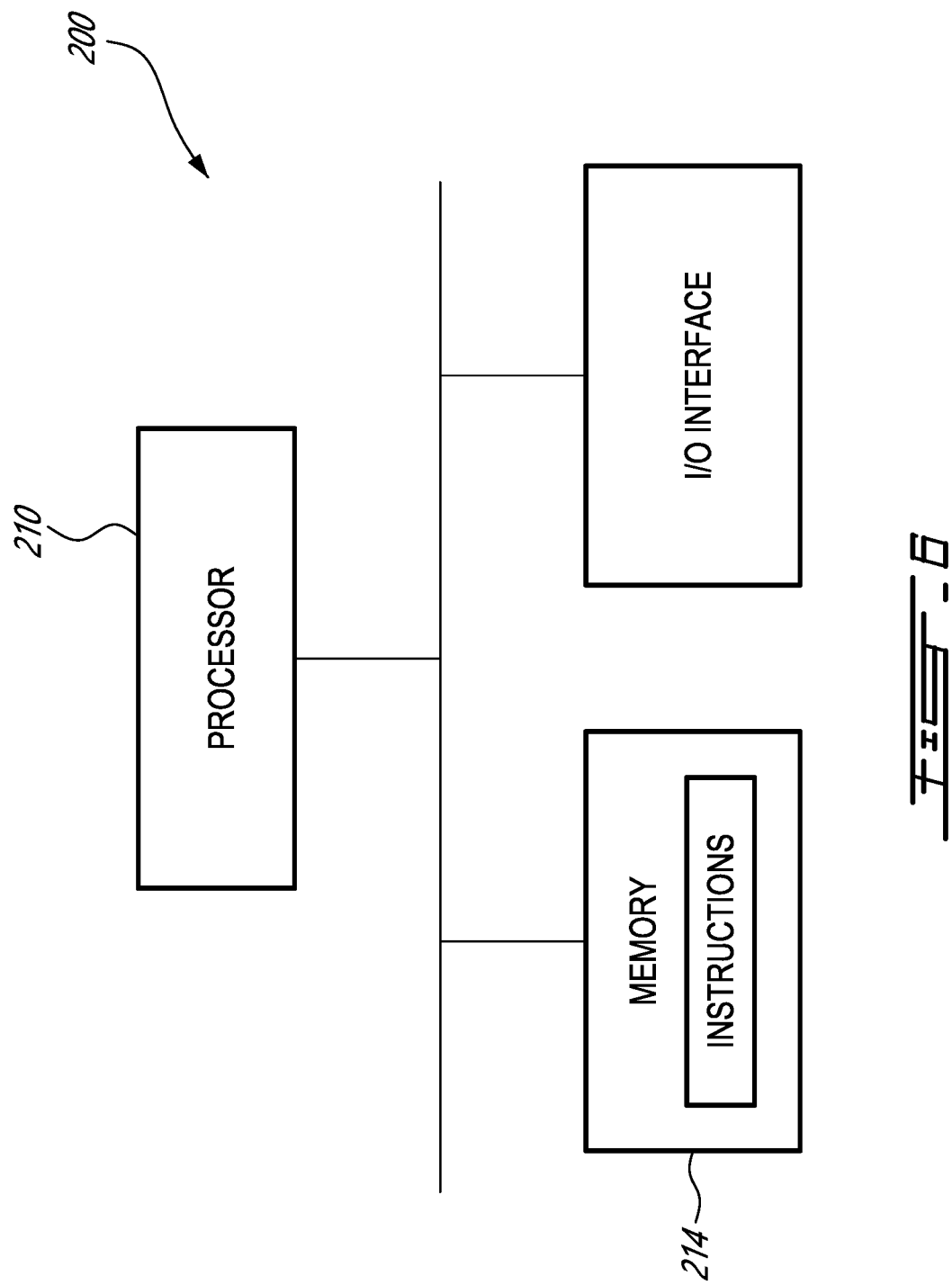

GAS TURBINE ENGINE AND ASSOCIATED METHOD OF CONTROLLING A VALVE

TECHNICAL FIELD

The application relates generally to gas turbine engines and, more particularly, to valves therefore.

BACKGROUND OF THE ART

Some valves, such as some types of bleed valves for instance, operate on the basis of controlling the pressure of an actuator fluid against a piston driving a poppet. While such valves were satisfactory to a certain degree, there always remains room for improvement, such as in mitigating inconveniences which may be associated to an eventual presence of contaminants in the actuator fluid.

SUMMARY

In one aspect, there is provided a method of controlling a bleed valve of a gas turbine engine comprising: sensing operating conditions of the gas turbine engine; generating a base value signal of a control parameter of the bleed valve based on the sensed operating conditions and on control data; determining whether a contaminant management condition is met; generating a control value signal of the control parameter including the base value signal and, when the contaminant management conditions is met, the control value signal further including a contaminant management signal of the control parameter value of the valve superposed to the base value signal, the contaminant management signal including at least three successive back and forth fluctuations of the control parameter value relative the base value signal over a period of 10 seconds or less; and controlling an actuator of the bleed valve based on the control value signal.

In another aspect, there is provided a computer-implemented method of controlling a valve having a piston slidingly mounted in a cylinder, a poppet driven to move towards and away from a valve seat by the sliding of the piston, a cavity opposite the poppet relative the piston, the cavity configured for receiving an actuator fluid, the method of controlling the valve comprising: generating a base value signal including a base value of pressure of the actuator fluid in the cavity varying over time based on operating conditions and on control data; determining whether contaminant management conditions are met; generating a control value signal including the base value signal and, when contaminant management conditions are met, the control value signal including a contaminant management signal superposed to the base value signal, the contaminant management signal including at least three subsequent back and forth fluctuations from the base value of pressure over a period of 10 seconds or less; and controlling the pressure of the actuator fluid in the cavity based on the control value signal.

In a further aspect, there is provided a gas turbine engine comprising: a bleed valve having an actuator having a control parameter, the bleed valve configured for controlling the passage of fluid from a main gas path to a bleed path; and a sensor configured for providing a value of a monitored parameter; a controller configured to generate a base value signal of a control parameter of the actuator based on the value of the monitored parameter and on control data; determine whether a contaminant management condition is met; generate a control value signal of the control parameter including the base value signal and, when the contaminant management conditions is met, the control value signal further including a contaminant management signal of the control parameter value of the valve superposed to the base value signal, the contaminant management signal including at least three successive back and forth fluctuations of the control parameter value relative the base value signal over a period of 10 seconds or less; and control the actuator of the bleed valve based on the control value signal.

DESCRIPTION OF THE DRAWINGS

Reference is now made to the accompanying figures in which:

FIG. 1 is a schematic cross-sectional view of a gas turbine engine;

FIG. 2A is fragmented oblique view of a valve;

FIG. 2B is a graph representing a relationship between a target control parameter value of the valve and a monitored parameter;

FIG. 3 is a block diagram representing a controller in an embodiment;

FIG. 5 is a flow chart of a method of controlling a valve; and

FIG. 6 is a block diagram of a computer.

DETAILED DESCRIPTION

Figure 4:
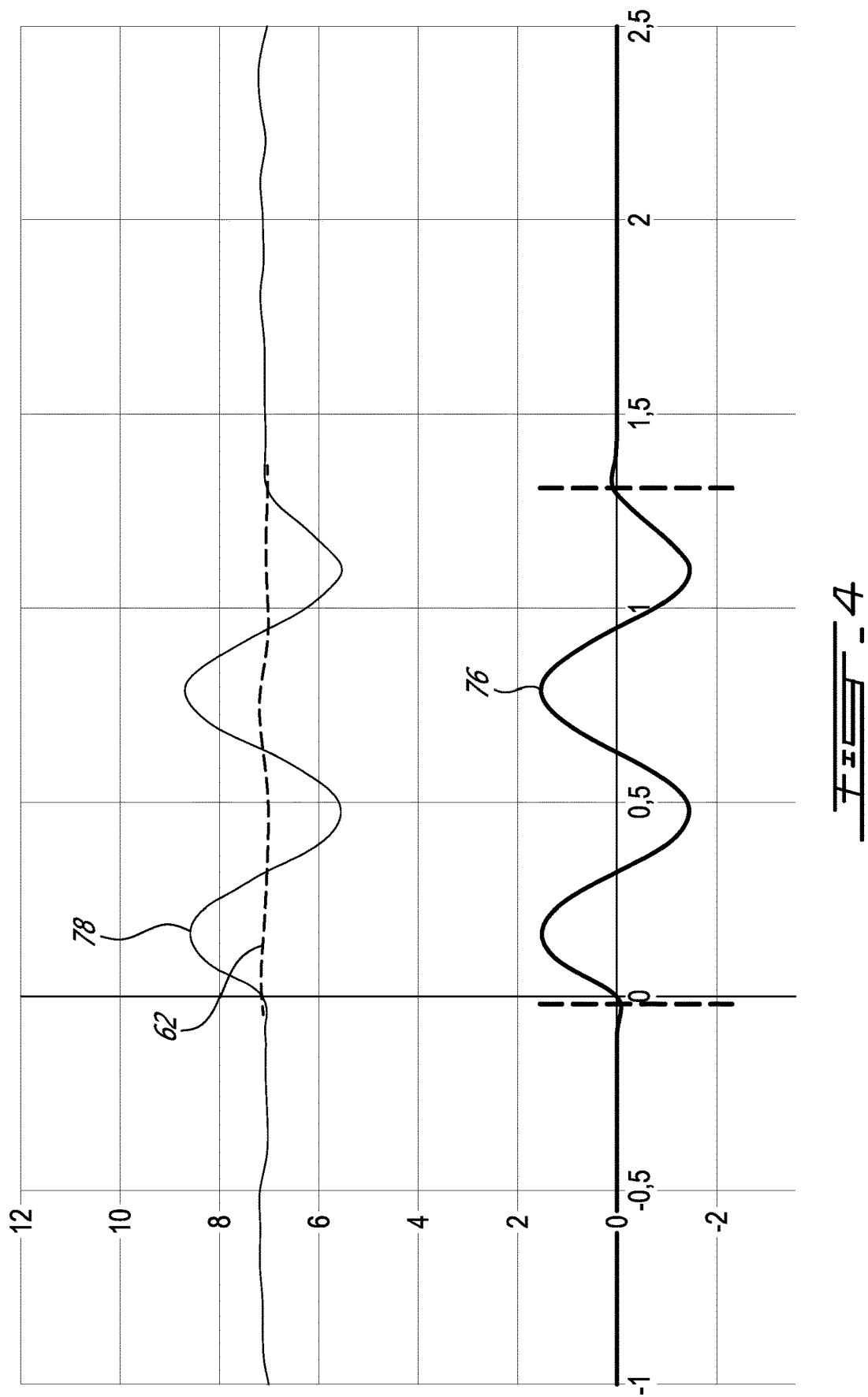
FIG. 4 is a graph representing the evolution of a valve control signal over time.

FIG. 1 illustrates an example of a turbine engine. In this example, the turbine engine 10 is a turboprop engine generally comprising in serial flow communication along a main gas path 13, a compressor section 12 for pressurizing the air, a combustor section 14 in which the compressed air is mixed with fuel and ignited for generating an annular stream of hot combustion gases around the engine axis 11, and a turbine section 16 for extracting energy from the combustion gases. The turbine engine 10 terminates in an exhaust section.

In the embodiment shown in FIG. 1, the turboprop engine 10 has multiple compressor and turbine stages, including a high pressure stage associated to a high pressure shaft 20, and a low pressure stage associated to a low pressure shaft 22. The low pressure shaft 22 is used as a power source during use.

In this specific embodiment, the low pressure stage has a single, axial, compressor stage 24, whereas the high pressure stage has a sequence of an axial compressor stage 26 followed by a centrifugal compressor stage 28. Different engines use different numbers and configurations of compressor stages, and the exact configuration can be selected as a function of their intended end use at the design stage. For convenience herein, the expression high pressure turbine stage will be used to refer to the turbine stage which is closest to the combustor along the main gas path, even if an alternate embodiment has a single turbine stage.

In this embodiment, one axial compressor stage 26 has a bleed valve 34. The bleed valve 34 can be mounted to the outer wall of the gas path, and can be opened at varying degrees of opening between 0% (fully closed) and 100% (fully open), to allow a corresponding flow rate of conveyed fluid, more specifically air in this embodiment, to escape the compressor stage in a manner to control pressure therein as a function of varying operating conditions. In alternate embodiments, the bleed valve can be switchable strictly between fully closed and fully open, as opposed to partially openable, though such a scenario may be less common. In alternate embodiments, more than one compressor stage may have a bleed valve, and in still other embodiments, bleed valves may be omitted from the entire engine. Bleed valves constitute an example of a variable geometry element having a control parameter which can be changed as a function of varying operating conditions to optimize engine performance. Variable guide vanes 30, 32 are another example of a variable geometry element having a control parameter (vane angle) which can be changed as a function of varying operating conditions to optimize engine performance.

One or more sensors 36, which can be of various types, can be used to sense current values of monitored parameters representative of operating conditions. During operation, a controller 50 can be configured to control the degree of opening of a bleed valve, or other valve(s), based on the current values of monitored parameters acquired from the sensors 36, and on instructions. Depending on the embodiment, the controller 50 can have additional functions as well such as controlling other control values of other variable geometry elements or even other functions of the engine.

FIG. 2A presents an example of a valve 34 which can be used as a bleed valve, for instance. This valve 34 is of a valve type which uses an actuator fluid acting against a piston 38 driving a poppet 40.

More specifically, in this embodiment, the piston 38 is slidingly received in a cylinder 42 formed in a housing 44. A cavity 46 is formed in the housing, the cavity 46 fluidly in contact with an actuating face of the piston 38. The cavity 46 can be designed to receive the actuator fluid in a manner that variations in pressure of the actuator fluid in the cavity 46 generates variations in an actuating force on the piston 38, the actuating force being aligned with the cylinder axis and directed towards the valve seat 48. The poppet 40 is configured for sliding together with the piston 38 between a 0% opening (fully closed) configuration where it is in contact with the valve seat 48, and a 100% opening (fully open—shown) configuration where the piston 38 is retracted to the cavity 46. In the specific context of a bleed valve application, the % opening of the poppet typically controls the flow rate of conveyed fluid from a main conduit (e.g. a main gas path 13 in a gas turbine engine application) to an evacuation conduit. Pressure of the conveyed fluid can generate a resistance force on the poppet 40, and thus indirectly on the piston 38, the resistance force being opposite to the actuating force. In scenarios where the resistance force is significant, or where the % opening needs to be minutely controllable to intermediary positions between the fully open and fully closed positions, one or more feedback sensors (not shown) can be used to detect the current position of the piston 38 relative the cylinder 42, or otherwise generate a signal indicative of the % opening of the valve 34, and communicate this value in real time to the controller 50 which can be configured in a manner to factor the current position in a feedback loop, for instance. Depending on the application, a pressure of the conveyed fluid acting directly against the poppet 40 can generate a significant opposing force, and the position of the piston 38 can represent an equilibrium between the two opposite forces.

The expression "bleed valve" is typically used in relation with the function of controlling the escape (bleed) of a potentially relatively finely controlled portion of the mass flow rate from a larger conduit. The larger conduit is typically a main gas path in the context of a gas turbine engine but other applications are possible. Moreover valves having similar elements than the valve of FIG. 2A, and facing similar issues, can be used for other uses than for bleeding purposes, and the control methods presented below can be applied to such alternate embodiments.

Depending on the application, different types of actuator fluid can be used, and the flow of different types of conveyed fluid can be controlled with similar valve constructions. It was found that in some cases, particulate contaminants carried in the actuator fluid could come to interfere with the proper operation of the valve. In the case of gas turbine engine bleed valve 34, for instance, where the actuator fluid includes compressed air from the main gas path 13, dust, dirt, or other particles carried by the compressed air in the main gas path 13 could make its way into the cavity 46. The same can be true, for instance, in the context of a valve actuated by liquid pressure such as fuel pressure or oil pressure, for instance where particulate contaminants can be present in the actuator oil. In particular, it was found that such contaminants could interfere with the proper operation of the valve 34, and more specifically interfere with the operation of a piston ring 70 housed in an annular groove 72 peripheral to the piston 38, the piston ring 70 being used to form a seal and a sliding engagement face between the piston 38 and the cylinder 42. In some tests performed on a gas turbine engine bleed valve, dirt or sand particles reaching the cavity 46 could take a few valve opening/closing cycles before making their way into interference with the piston ring 70, where it could interfere with the proper operation of the valve 34. More specifically, the piston ring can be annular with a gap between two free ends. The free ends can be configured with a male-female configuration as shown, which is configured to limit leakage across the free ends when the piston ring is received in the groove 72 and engaged within the cylinder 42. Particulate contaminants can become trapped within the male-female configuration of the free ends.

Interestingly, however, such particulate contaminants eventually made their way back out from interference with piston ring 70 after a few additional cycles of the valve 34, at which point they no longer interfered with the proper operation of the valve 34.

It was found that this latter phenomenon could be harnessed to free particulate contaminants from interference with a piston controlled valve 34, or prevent such interference from interfering with normal, design operation of the piston controlled valve 34. For instance, a duty cycle of a plurality of back and forth movements of the valve 34 can be implemented at a period of time when the actuator fluid is known to be free of contaminants, potentially at a time when the % opening of the valve does not need to be controlled precisely for another function.

Interestingly, in some embodiments, the particulate contaminant freeing action can be traced specifically to the movement of the piston ring 70 in the cylinder 42, and when the annular groove 72 receiving the piston ring 70 has an axial width which is larger than the thickness of the piston ring 70, the piston ring 70 can move axially within the cylinder 42, and within the groove 72, even while the piston 38 maintains a constant axial position, opening the way to implementing a method of ridding the piston ring 70 from contaminants while simultaneously controlling the piston 38 to produce a desired % opening value of the poppet 40. This can be the case, for instance, when the actuator fluid and the conveyed fluid are both compressed air, which can be the case in a gas turbine engine bleed valve application, and when the actuator fluid and the conveyed fluid exert axially opposing forces against the piston ring.

To better understand the latter explanation, let us first turn to FIG. 3, which represents a controller 50. The controller 50 can be embodied as some form of computer, and have different software or hardware functionalities which will be referred to as modules. In the illustrated embodiment, the functionalities are implemented in the form of associated sets of computer readable instructions 60 stored in a memory system accessible by a processor. Generally, the controller operates in a manner to control a control parameter of a valve 34, such as a value of an actuator fluid pressure in the cavity which is related to the % opening of the poppet 40, based on changing operating conditions, which can be received as some form of input such as sensor signals 56 for instance.

A first one of these functionalities will be referred to as a scheduling module 58. The scheduling module 58 can have control data 59 which represents a relationship between values of one or more monitored parameter and a corresponding value of the control parameter.

An example of control data 59 for a bleed valve 34 such as illustrated in FIG. 2A is graphically represented in FIG. 2B. More specifically, the control data 59 in FIG. 2B presents a relationship between valve % opening (Y-axis) considered optimal as a function of varying rotation speeds (X-axis) of the rotor bearing the compressor blades of the compressor stage to which the bleed valve is associated. When the rotation speed is low, the desired % opening is 100%, when the rotation speed is high, the desired % opening is 0%, and in this embodiment, the desired % opening varies linearly as a function of rotation speed over a range of intermediate rotation speeds. It will be stressed that this is but one example of a relationship between values of monitored parameter(s) and the value of a control parameter and that various alternate embodiments exist.

The output of the scheduling module will be referred to herein as a base value signal 62 representative of a desired % opening of the valve which can be understood to change over time as a function of one or more variations in conditions manifested as inputs. In one embodiment, the % opening of the valve can be controlled directly or indirectly based on that base value signal 62. In practice, the control is actually somewhat indirect. Indeed, in an embodiment such as the valve of FIG. 2A, the control handle is the pressure of the actuator fluid in the cavity 46. This pressure can be controlled by mixing two different sources of compressed air at different pressures, in varying ratios. Moreover, the relationship between the pressure in the cavity 46 and the position of the % opening may not be direct, as it may depend on the opposing pressure of the conveyed fluid. Such details can be implemented via the scheduling module with a feedback loop wherein an input representative of the actual % opening of the valve is received and the scheduling module 58 compares the actual % opening to the target supplied by the base value signal, and increases or decreases the mixing ratio of the sources of compressed air accordingly, for instance. In view of the above, it will be understood that the base value signal can be expressed in units of pressure in the cavity or in units of mixing ratio rather than directly in terms of % opening, for instance.

It will be understood that in an embodiment such as presented above, the value of % opening of the valve, and the values of the control parameter expressed in the base value signal 62, can vary over time based on the control data 59 and varying operation conditions. However, these variations can occur at a relatively low rate of variation over time, such as to appear relatively flat when illustrated on a timescale of seconds, an example of which is presented in FIG. 4 (x-axis).

Referring back to FIG. 3, in this embodiment, another module, referred to as a contaminant management module 64, is implemented. The contaminant management module is responsible here of determining whether conditions warranting the usage of the contaminant mitigation technique are met. Such conditions will be referred to herein as contaminant management conditions for short, and can represent some form of trigger which engages the contaminant management technique. Triggering the contaminant management technique can be based on one or more a variety of factors and the details can depend on the ultimate implementation details. For instance, depending on the embodiment, one or more of the following can constitute potential triggers: an input indicative of a potential presence of contaminants in the actuator fluid; an input indicative of a malfunction of the valve, determining that a given amount of engine cycles have occurred since the last trigger, determining that a given amount of valve opening/closing cycles have occurred since the last trigger, and a pilot command.

To provide an example, in the context of a bleed valve 34 application in a gas turbine engine 10, presence of contaminants can be known to be likely at takeoff or landing, or during taxiing, for instance, which can constitute an operating condition communicated to the controller in the form of an input, serving as a trigger to the contaminant management technique. The implementation of the contaminant management technique can be immediate or deferred, e.g. may take place once the aircraft has taken off and once the risk of particulate in the actuator fluid is no longer present. Alternately, in an embodiment where the valve is provided with equipment adapted to confirm a correct functioning mode of operation, and to detect malfunctioning mode of operation, such a detection of a malfunctioning mode of operation can serve as an activating trigger. Such equipment can take the form of a software module integrated to the controller, for instance, and which is adapted to recognize indications of malfunctions provided by one or more sensed parameter (e.g. valve responding more slowly than expected to a variation in the control parameter value).

Depending on the details of the ultimate implementation, there can be a single trigger, or multiple triggers, and in cases where multiple triggers are configured, activation logic can be provided to determine what is done in which scenario. Activation logic can be relatively simple, such as an "or" gate leading to triggering activation when any one of the triggering conditions are met, or more elaborate, such as leading to triggering based on more than one condition, and potentially more than one combination of conditions. Such activation triggers can be defined in contaminant management data 65 of the contaminant management module 64.

Referring back to FIG. 4, in an embodiment, the contaminant mitigation technique can involve superposing a contaminant management signal 76 including a plurality of back and forth variations in the value of the control parameter to the base value signal 62, for a given period of time following activation (i.e. determining that a contaminant management condition is met). In this embodiment, the plurality of back and forth variations are embodied in the form of sinusoidal-shaped variations but it will be understood that this latter feature is optional and can vary in alternate embodiments such as square, triangle, pulse, ramp, and even an irregular or random signal like white noise, etc.

In the embodiment represented in FIG. 4, it will be noted that the plurality of back and forth variations in the value of the control parameter can be applied independently of what the current value of the base value signal 62 is during the activation, i.e. as variations centered on the evolving current value of the base value signal. Alternately, the plurality of back and forth variations can be embodied as repetitions of slightly increasing and then slightly decreasing the value of the control parameter from a fully closed state, or as repetitions of slightly decreasing and then slightly increasing the value of the control parameter from a fully open state. The plurality of back and forth variations can persist for a given duration, and their termination can be referred to as de-activation. The plurality of back and forth variations can take place at a rate of change which can be significantly higher than a typical, or maximum, rate of change of the base value signal.

More specifically, the back and forth fluctuations can take place relatively quickly, such as a sequence of three or more back and forth fluctuations occurring over a period of 10 seconds or less. A notion of frequency of the back and forth fluctuations can be introduced in embodiments where the back and forth fluctuations are repeated more or less regularly, and the frequency can be of 1 Hz (i.e. 10 back and forth fluctuations over a period of 10 seconds) or more (i.e. more than 10 back and forth fluctuations over a period of 10 seconds). Here, the period of 10 seconds is chosen somewhat arbitrarily in order to provide a reference. In practice, the three or more back and forth fluctuations can occur over a period smaller than or larger than 10 seconds. In some example embodiments repeating 7 or more back and forth fluctuations can be considered suitable, and in many tested or simulated embodiments, using between 10 and 20 sinusoidal oscillations at a frequency or between 0.3 and 1 Hz generated satisfactory results.

FIG. 4 graphically represents the superposition of back and forth fluctuations to the base value signal where the evolving value of the base value signal 62 during the period of the back and forth fluctuations is represented as a dashed lines, a contaminant management signal 76 representing the fluctuations is illustrated in a solid line in the lower portion, and the value of pressure in the cavity can be controlled as a function of a control value signal 78 corresponding to the superposition of the base value signal 62 and of the contaminant management signal 76. In other words, when the contaminant management conditions are not met, the control value signal 78 generated by the control module 79 can correspond to the base value signal 62, whereas when the contaminant management conditions are met, the control value signal 78 can correspond to a sum of the base value signal 62 and of the contaminant management signal 76.

Referring back to FIG. 3, the contaminant management module can be responsible for generating the contaminant management signal and for determining a duration thereof. As for "activation" of the contaminant management technique, one or more deactivation triggers can be configured in a same or in different embodiments, and the details can depend on the ultimate implementation details. For instance, depending on the embodiment, one or more of the following can constitute potential deactivation triggers: an input indicative of an absence of contaminants in the actuator fluid, an input indicative of a correct functioning of the valve, determining that a given amount of back and forth fluctuation cycles has been performed (e.g. by preprogramming the contaminant management signal to last a given number of back and forth fluctuation cycles), determining that the contaminant management signal has lasted a given period of time, receiving a command from the pilot requesting deactivation, etc.

Depending on the details of the ultimate implementation, there can be a single deactivation trigger, or multiple deactivation triggers, and in cases where multiple triggers are configured, deactivation logic can be provided to determine what is done in which scenario. Deactivation logic can be relatively simple, such as an "or" gate leading to triggering activation when any one of the triggering conditions are met, or more elaborate, such as leading to triggering deactivation based on more than one condition, and potentially more than one combination of conditions. For instance, if activation was based on software detection of a contamination bleed valve issue, the cycling could continue until the software detects a clearing of the contamination issue. In such cases, the method to detect the presence of contaminant could be based on one or various dedicated sensors such as optical, photoelectric, magnetic, direct leakage pressure measurement, direct position reading, acoustic, capacitive, etc. Deactivation triggers and deactivation logic can be integrated as part of the contaminant management module 64 in the form of contaminant management data 65.

Accordingly, with reference to FIG. 5, a method of controlling a bleed valve can include sensing 100 operating conditions of the gas turbine engine; generating 102 a base value signal of a control parameter of the bleed valve based on the sensed operating conditions and on control data; determining 104 whether a contaminant management condition is met; generating 106 a control value signal of the control parameter including the base value signal and, when the contaminant management condition is met, the control value signal including a contaminant management signal of the control parameter value of the valve superposed to the base value signal, the contaminant management signal including at least three subsequent back and forth fluctuations of the control parameter value relative the base value signal over a period of 10 seconds or less; and controlling 108 an actuator of the bleed valve based on the control value signal.

Referring to FIG. 6, it will be understood that the expression "computer" 200 as used herein is not to be interpreted in a limiting manner. It is rather used in a broad sense to generally refer to the combination of some form of one or more processing units 210 and some form of memory system 214 accessible by the processing unit(s). The memory system can be of the non-transitory type. The use of the expression "computer" in its singular form as used herein includes within its scope one or more processing units working to perform a given function.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. In the context of this specification, a computer or controller can be implemented in a cloud based, or virtual-machine based manner via software applications.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in some embodiments, it can be preferred for activation logic to trigger the back and forth fluctuations only if the valve is at the fully open or fully closed state to avoid any engine power or thrust fluctuations which may be generated by superposing the fluctuations to an intermediary state of opening. The technique presented herein can be applied to various types of engine valves (e.g. whether on turboprop, turboshaft, turbofan, industrial turbine, turbojet, hybrid . . . ) and even in embodiments others than engines. Yet further modifications could be implemented by a person of ordinary skill in the art in view of the present disclosure, which modifications would be within the scope of the present technology.

The invention claimed is:

1. A method of controlling a bleed valve of a gas turbine engine comprising:
sensing operating conditions of the gas turbine engine;
generating a base value signal of a control parameter of the bleed valve based on the sensed operating conditions and on control data of the gas turbine engine;
determining whether a contaminant management condition is met;
generating a control value signal of the control parameter including the base value signal and, when the contaminant management condition is met, the control value signal further including a contaminant management signal of the control parameter value of the valve superposed to the base value signal, the contaminant management signal including at least three successive back and forth fluctuations of the control parameter value relative the base value signal over a period of 10 seconds or less; and
controlling an actuator of the bleed valve based on the control value signal.

2. The method of claim 1 wherein the actuator of bleed valve includes a piston slidingly mounted in a cylinder, a poppet configured to move towards and away from a valve seat based on the sliding of the piston, a cavity opposite the poppet relative the piston, wherein controlling the actuator includes controlling a pressure of actuator fluid in the cavity to drive the sliding of the piston.

3. The method of claim 2 wherein the back and forth fluctuations are of an amplitude configured to move a ring surrounding the piston axially within an annular groove formed in the piston, without sliding the piston within the cylinder.

4. The method of claim 2 wherein said bleed valve is associated to a compressor stage of the gas turbine engine, the compressor stage having blades protruding radially from a rotary shaft, said sensing operating conditions of the gas turbine engine includes measuring a rotation speed of the rotary shaft and said control data establishes a relationship between said measured rotation speed and the pressure of the actuator fluid.

5. The method of claim 1 wherein the contaminant management signal is superposed to the base value signal while the base value signal remains at a valve fully closed value.

6. The method of claim 1 wherein the contaminant management signal is superposed to the base value signal while the base value signal remains at a valve fully open value.

7. The method of claim 1 wherein the contaminant management signal is superposed to the base value signal while the base value signal remains within a range of valve partially open values.

8. The method of claim 1 wherein the back and forth fluctuations have a frequency of 1 Hz or more.

9. The method of claim 1 wherein the back and forth fluctuations are sinusoidal.

10. The method of claim 1 wherein the contaminant management signal includes at least seven back and forth fluctuations.

11. The method of claim 1 wherein the contaminant management signal is maintained for between 10 and 20 successive back and forth fluctuations before being interrupted.

12. The method of claim 1 wherein said determining whether the contaminant management conditions are met includes at least one of detecting a presence of contaminant, detecting malfunction of bleed valve, determining that a threshold amount of gas turbine engine runtime has elapsed, determining that a threshold amount of engine cycles have occurred, determining that a threshold amount of valve open/close cycles have elapsed, and receiving a pilot command.

13. The method of claim 1 wherein the contaminant management signal has a duration of more than 10 seconds and includes more than three successive back and forth fluctuations.

14. The method of claim 1 wherein said including the contaminant management signal superposed to the base signal includes interrupting the contaminant management signal upon at least one of detecting that contaminants are not present, detecting that the bleed valve is functioning normally, determining that a threshold amount of back and forth fluctuations have been completed, determining that a threshold amount of time has elapsed, and receiving a deactivation command from the pilot.

15. A computer-implemented method of controlling a valve having a piston slidingly mounted in a cylinder, a poppet driven to move towards and away from a valve seat by the sliding of the piston, a cavity opposite the poppet relative the piston, the cavity configured for receiving an actuator fluid, the method of controlling the valve comprising:

generating a base value signal including a base value of pressure of the actuator fluid in the cavity varying over time based on operating conditions and on control data;

determining whether contaminant management conditions are met;

generating a control value signal including the base value signal and, when contaminant management conditions are met, the control value signal including a contaminant management signal superposed to the base value signal, the contaminant management signal including at least three subsequent back and forth fluctuations from the base value of pressure over a period of 10 seconds or less; and controlling the pressure of the actuator fluid in the cavity based on the control value signal.

16. The computer-implemented method of claim 15 wherein said operating conditions include acquired values of one or more monitored parameter.

17. A gas turbine engine comprising:
a bleed valve having an actuator having a control parameter, the bleed valve configured for controlling the passage of fluid from a main gas path to a bleed path; and
a sensor configured for providing a value of a monitored parameter;
a controller configured to
generate a base value signal of a control parameter of the actuator based on the value of the monitored parameter and on control data;
determine whether a contaminant management condition is met;
generate a control value signal of the control parameter including the base value signal and, when the contaminant management conditions is met, the control value signal further including a contaminant management signal of the control parameter value of the valve superposed to the base value signal, the contaminant management signal including at least three successive back and forth fluctuations of the control parameter value relative the base value signal over a period of 10 seconds or less; and
control the actuator of the bleed valve based on the control value signal.

18. The gas turbine engine of claim 17 wherein the actuator of bleed valve includes a piston slidingly mounted in a cylinder, a poppet configured to move towards and away from a valve seat based on the sliding of the piston, a cavity opposite the poppet relative the piston, wherein controlling the actuator includes controlling a pressure of actuator fluid in the cavity to drive the sliding of the piston.

19. The gas turbine engine of claim 18 wherein the back and forth fluctuations are of an amplitude configured to move a ring surrounding the piston axially within an annular groove formed in the piston, without sliding the piston within the cylinder.

20. The gas turbine engine of claim 18 wherein said bleed valve is associated to a compressor stage of the gas turbine engine, the compressor stage having blades protruding radially from a rotary shaft, said sensing operating conditions of the gas turbine engine includes measuring a rotation speed of the rotary shaft and said control data establishes a relationship between said measured rotation speed and the pressure of the actuator fluid.

* * * * *